(12) United States Patent
Sakamoto et al.

(10) Patent No.: US 8,774,012 B2
(45) Date of Patent: Jul. 8, 2014

(54) WIRELESS COMMUNICATION DEVICE

(71) Applicants: Masprodenkoh Kabushikikaisha, Nisshin (JP); Denso Corporation, Kariya (JP)

(72) Inventors: Toru Sakamoto, Nisshin (JP); Masahiro Kuwabara, Obu (JP); Minoru Okada, Nagoya (JP)

(73) Assignees: Masprodenkoh Kabushikikaisha, Nisshin-shi (JP); Denso Corporation, Kariya-shi (JP)

( * ) Notice: Subject to any disclaimer, the term of this patent is extended or adjusted under 35 U.S.C. 154(b) by 111 days.

(21) Appl. No.: 13/645,501

(22) Filed: Oct. 4, 2012

(65) Prior Publication Data

US 2013/0088954 A1    Apr. 11, 2013

(30) Foreign Application Priority Data

Oct. 7, 2011   (JP) ................................. 2011-223018

(51) Int. Cl.
*H04L 12/26* (2006.01)
(52) U.S. Cl.
USPC ...... 370/242; 370/248; 455/115.1; 455/115.2
(58) Field of Classification Search
USPC ................... 370/242, 248; 455/115.1, 115.2
See application file for complete search history.

(56) References Cited

U.S. PATENT DOCUMENTS

| 7,062,235 | B2* | 6/2006 | Henriksson | 455/115.2 |
| 2002/0137506 | A1* | 9/2002 | Matsuoka | 455/425 |
| 2005/0090245 | A1* | 4/2005 | Kim | 455/425 |
| 2012/0282899 | A1* | 11/2012 | Parmar et al. | 455/411 |
| 2013/0090068 | A1* | 4/2013 | Naruse et al. | 455/67.11 |

FOREIGN PATENT DOCUMENTS

| JP | 5145499 A | 6/1993 |
| JP | 9304509 A | 11/1997 |

\* cited by examiner

*Primary Examiner* — Albert T Chou
(74) *Attorney, Agent, or Firm* — Jenkins, Wilson, Taylor & Hunt, P.A.

(57) ABSTRACT

A disclosed wireless communication device performing transmission and reception in a time-division manner includes an antenna, a transmission unit, a reception unit, a transmission/reception switchover unit, a first path switchover unit, a directional coupler, a second path switchover unit, a first fault diagnosis unit, and a second fault diagnosis unit. The second fault diagnosis unit causes the second path switchover unit to form a reflection signal input path; causes a second transmission signal level-adjusted for fault diagnosis to be outputted from the transmission unit; acquires a signal level of a reflection signal from the antenna inputted from the directional coupler into the reception unit; and determines whether or not a transmission radio wave is normally emitted from the antenna based on the signal level of the reflection signal.

11 Claims, 5 Drawing Sheets

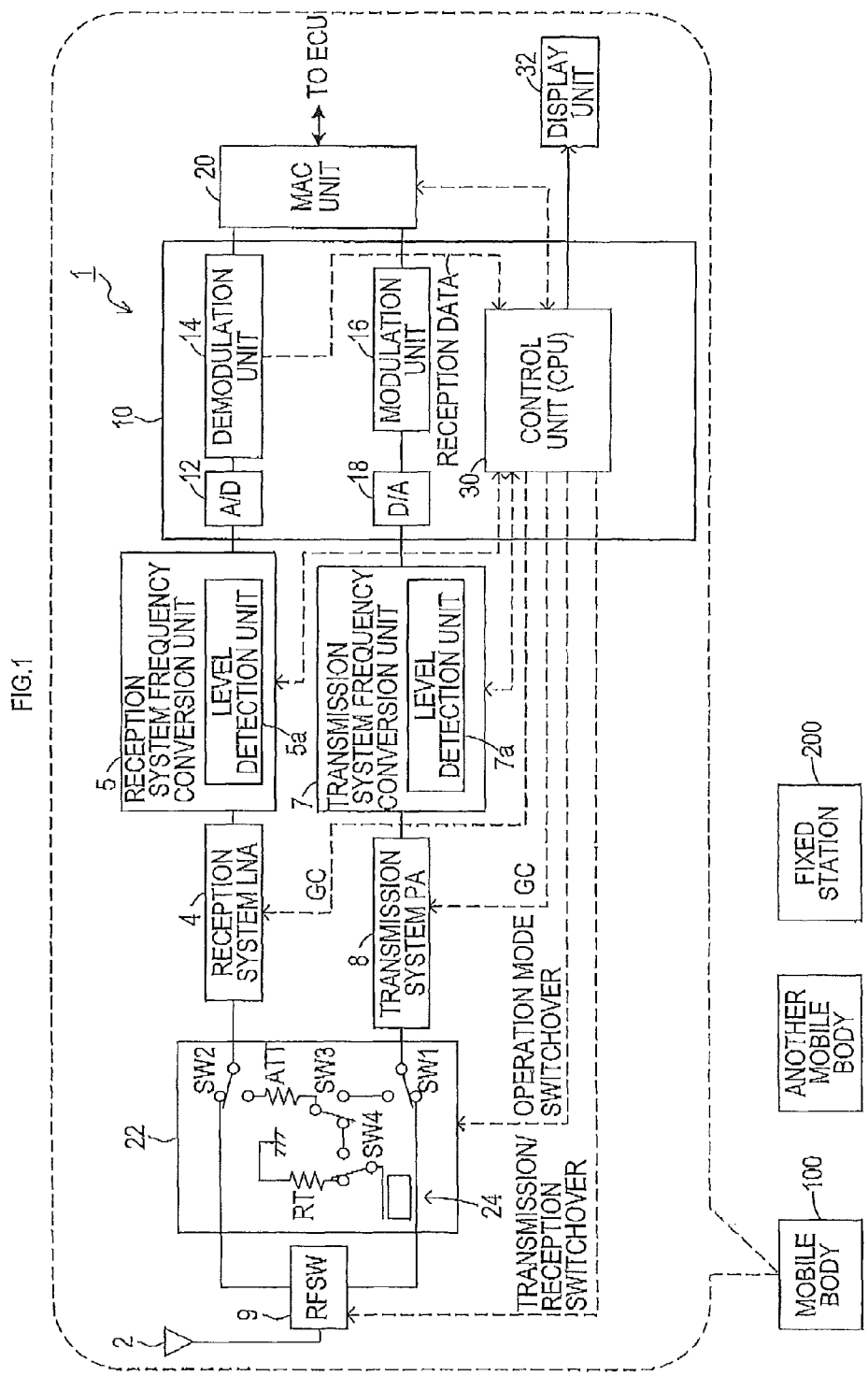

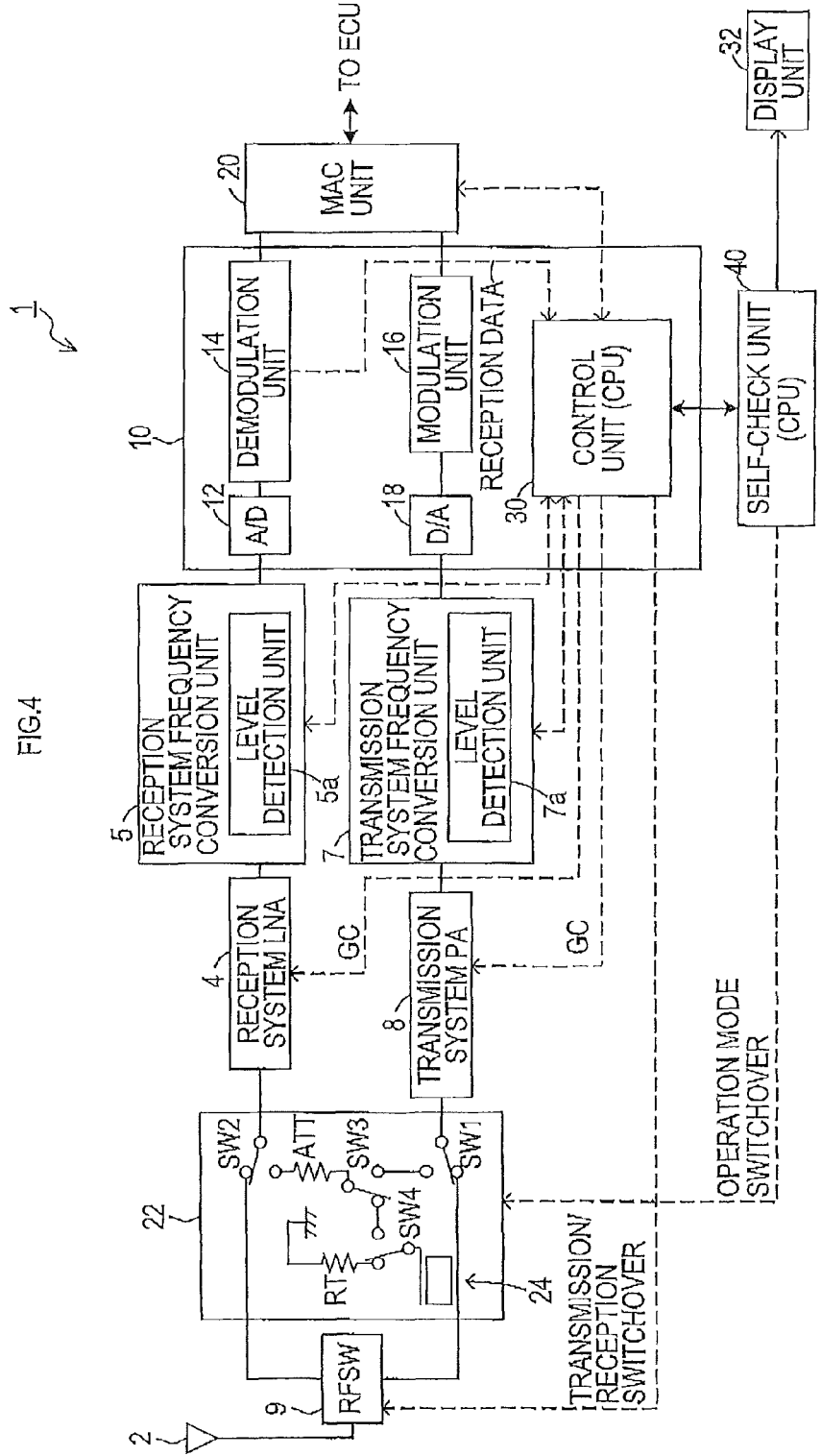

WIRELESS COMMUNICATION DEVICE

CROSS-REFERENCE TO RELATED APPLICATIONS

This application claims the benefit of Japanese Patent Application No. 2011-223018 filed Oct. 7, 2011 in the Japan Patent Office, the disclosure of which is incorporated herein by reference.

BACKGROUND

The present invention relates to a wireless communication device that performs transmission and reception in a time-division manner. Specifically, the present invention relates to a wireless communication device that has a function of self-diagnosing a transmission system and a reception system.

A wireless communication device that performs transmission and reception in a time-division manner generally includes a transmission system circuit that performs modulation, amplification and the like of a transmission signal; a reception system circuit that performs amplification, demodulation and the like of a reception signal; and a transmission/reception switchover switch that switches between a transmission period and a reception period by connecting either of these two types of circuits to an antenna.

In an example of the wireless communication device disclosed in Japanese Unexamined Patent Application Publication No, 5-145499, a loopback path is formed, which is designed to input the transmission signal from the transmission system circuit directly into the reception system circuit, between a transmission signal path leading from the transmission system circuit down to the transmission/reception switchover switch and a reception signal path leading from the transmission/reception switchover switch down to the reception system circuit. The example is configured to perform a fault diagnosis of the transmission system circuit and the reception system circuit by determining whether or not the transmission signal from the transmission system circuit has been successfully received by the reception system circuit.

SUMMARY

The above example has a problem in which, even when the transmission, system circuit and the reception system circuit are operating normally, if an abnormality occurs in a transmission path of the transmission signal leading from the transmission system circuit through the transmission/reception switchover switch down to the antenna, or if the antenna itself is out of order, a transmission radio wave corresponding to the transmission signal outputted from the transmission system circuit is not emitted from the antenna and, therefore, wireless communication cannot be performed normally.

However, in the above example, although a fault diagnosis of the transmission system circuit and the reception system circuit can be performed, a fault diagnosis of an antenna side leading from the transmission system circuit through the transmission/reception switchover switch down to the antenna cannot be performed.

Therefore, in the above example, the only way to perform a fault diagnosis of the antenna side is, for example, to determine whether or not a response signal corresponding to the transmission signal made outputted from the transmission system circuit is transmitted from another wireless communication device and the response signal is successfully restored in the reception system circuit. Therefore, the above example has a problem in which a fault diagnosis of the antenna side cannot be performed when there exists no other wireless communication device to communicate with around the above example.

Consequently, for example, in a case where the above example is utilized as a mobile station installed in a mobile body (in other words, in a case where a vehicle-to-vehicle communication is performed) or utilized as a fixed station performing a wireless communication with a mobile station (in other words, in a case where a road-to-vehicle communication is performed), when another wireless communication device is approaching a vicinity of its own station, the above example may not be able to transmit information of its own station to the another wireless communication device due to a fault on the antenna side. As a result, the vehicle-to-vehicle communication or the road-to-vehicle communication may not be able to be performed normally.

Accordingly, it is preferable that the present invention can provide a wireless communication device that performs transmission and reception in a time-division manner and is capable of self-diagnosing an operation state of an antenna side including an emission state of a radio wave from an antenna, in addition to operation states of a transmission system circuit and a reception system circuit, even when there exists no other wireless communication device around the wireless communication device.

The present invention relates to a wireless communication device that performs transmission and reception in a time-division manner. The wireless communication device includes an antenna for communication, a transmission unit, a reception unit, a transmission/reception switchover unit, a first path switchover unit, a directional coupler, a second path switchover unit, a first fault diagnosis unit, and a second fault diagnosis unit. The transmission unit amplifies a transmission signal and outputs the amplified transmission signal to the antenna. The reception unit amplifies a reception signal from the antenna and signal processes the amplified reception signal. The transmission/reception switchover unit selectively connects the antenna to either of the transmission unit and the reception unit. The first path switchover unit closes a transmission signal path between the transmission unit and the transmission/reception switchover unit, and a reception signal path between the transmission/reception switchover unit and the reception unit, to thereby form a loopback path that inputs the transmission signal from the transmission unit into the reception unit. The directional coupler is provided in the transmission signal path and extracts a reflection signal from the antenna flowing through the transmission signal path. The second path switchover unit forms a reflection signal input path that inputs the reflection signal extracted by the directional coupler into the reception unit. The first fault diagnosis unit forms the loopback path through the first path switchover unit; causes a first transmission signal level-adjusted for fault diagnosis to be outputted from the transmission unit; acquires from the reception unit at least either of a signal level of the reception signal and a result of the signal-processing of the reception signal; and determines whether or not the first transmission signal from the transmission unit has been normally received by the reception unit based on the at least either of the signal level of the reception signal and the result of the signal-processing of the reception signal. The second fault diagnosis unit causes the second, path switchover unit to form the reflection signal input path; causes a second, transmission signal level-adjusted for fault diagnosis to be outputted from the transmission unit; acquires a signal level of the reflection signal from the antenna inputted from the directional coupler into the reception unit; and determines whether or not a transmission radio wave has been normally emitted from the antenna based on the signal level of the reflection signal.

In short, in the wireless communication device configured as such, so-called half-duplex wireless communication with another wireless communication device is performed by switching a connection path to the antenna to either of a transmission unit side and a reception unit side through the transmission/reception switchover unit. When the first fault diagnosis unit is activated, the loopback path is formed through the first path switchover unit, and the first transmission signal level-adjusted for fault diagnosis is outputted from the transmission unit. As a result, the first transmission signal outputted from the transmission unit is inputted into the reception unit in a similar manner as in the above-described background art.

In such a state, the first fault diagnosis unit acquires the at least either of the signal level of the reception signal and the result of the signal-processing of the reception signal (e.g., reception data) from the reception unit, and determines whether or not the first transmission signal from the transmission unit has been normally received by the reception unit, i.e., whether or not both of the transmission unit and the reception unit are normally operating, based on the at least either of the acquired signal level and the result of the signal-processing.

When the second fault diagnosis unit is activated, the reflection signal input path is formed by the second path switchover unit, and the second transmission signal level-adjusted for fault diagnosis is outputted from the transmission unit. As a result, the second transmission signal outputted from the transmission unit is transmitted down to the antenna, and if the transmission path and the antenna are in a normal state, the transmission radio wave corresponding to the second transmission signal is emitted from the antenna with low loss. In contrast, if there exists an abnormality in the transmission path or the antenna, the second transmission signal is not transmitted from the antenna, or even when the second transmission signal is transmitted, the transmission radio wave is low level, and the reflection signal reflected from the antenna to the transmission unit side is high level.

At this time, since the reflection signal reflected from the antenna to the transmission unit side is inputted from the directional coupler into the reception unit through the reflection signal input path, if the transmission path of the transmission signal from the transmission unit to the antenna and the antenna are in a normal state, an input level of the reflection signal into the reception unit is low level, and if there exists an abnormality in the transmission path or the antenna, the input level of the reflection signal into the reception unit is high level.

Therefore, after causing the second path switchover unit to form the reflection signal input path and causing the second transmission signal to be outputted from the transmission unit, the second fault diagnosis unit acquires the signal level of the reflection signal inputted from the directional coupler into the reception unit, and determines whether or not the transmission radio wave is normally emitted from the antenna (in other words, whether or not the transmission path of the transmission signal from the transmission unit to the antenna and the antenna itself are in a normal state) based on the signal level of the reflection signal.

Accordingly, in the wireless communication device of the present invention, it is possible not only to self-diagnose whether or not the transmission unit and the reception unit are normally operating by the first fault diagnosis unit, but also to self-diagnose whether or not the transmission path of the transmission signal leading from the transmission unit down to the antenna through the transmission/reception switchover unit and the antenna are in a normal state by the second fault diagnosis unit.

Furthermore, since the diagnosis by the second fault diagnosis unit is performed by extracting the reflection signal of the second transmission signal reflected from the antenna to the transmission unit side through the directional coupler, inputting the extracted reflection signal into the reception unit, and detecting the signal level of the extracted reflection signal, it is not necessary to utilize a reception signal from another wireless communication device when diagnosing a fault in the transmission path of the transmission signal leading from the transmission unit down to the antenna and the antenna itself.

Thus, according to the present invention, the wireless communication device performing a vehicle-to-vehicle communication or a road-to-vehicle communication, for example, can perform a fault diagnosis of the transmission path of the transmission signal leading from the transmission unit down to the antenna and the antenna itself even when there exists no other wireless communication device to communicate with around the wireless communication device. As a result, reliability of the wireless communication device can be enhanced.

The first fault diagnosis unit may be activated when an operation mode of the wireless communication device is switched from a normal mode in which wireless transmission and wireless reception are performed in a time-division manner to a fault diagnosis mode. The second fault diagnosis unit may be activated when it is determined by the first fault diagnosis unit that the first transmission signal from the transmission unit has been normally received by the reception unit, and may terminate formation of the loopback path by the first path switchover unit before causing the second path switchover unit to form the reflection signal input path.

The loopback path may include an attenuator that adjusts an input level of, the transmission signal into the reception unit.

In such a case, when the first fault diagnosis unit performs a fault diagnosis of the transmission unit and the reception unit, it is possible to suppress a remarkably high-level transmission signal from being inputted into the reception unit when the transmission unit is out of order to thereby damage the reception unit.

The attenuator may be a variable attenuator. In such a case, it is possible to change the signal level of the transmission signal inputted from the transmission unit into the reception unit when a fault diagnosis is performed by the first fault diagnosis unit. By performing a plurality of fault diagnoses under different level conditions, accuracy of the diagnosis can be enhanced.

The second path switchover unit may include a termination resistor that terminates an output end of the reflection signal of the directional coupler with proper impedance when the reflection signal input path is not formed.

In such a case, when the second fault diagnosis unit does not perform a fault diagnosis (i.e., in a normal mode in which normal wireless communication is performed, or when the first fault diagnosis unit is operating), it is possible to suppress an output side of the directional coupler becomes open to emit from an open end thereof a reflection signal from the antenna, or to suppress transmission impedance of the signal path leading from the transmission unit down to the antenna from deviating from proper impedance to deteriorate transmission properties of the wireless communication device.

The wireless communication device of the present invention may include an indication unit that indicates a result of a diagnosis by the first fault diagnosis unit and the second fault diagnosis unit.

In such a case, it is possible to indicate to an administrator (a user etc.) of the wireless communication device a fault in the transmission unit or in the reception unit, or a fault in the transmission path of the transmission signal leading from the transmission unit down to the antenna or the antenna itself, and to encourage the administrator to repair the device.

The wireless communication device of the present invention may include a communication device power interruption unit that interrupts a power supply of the wireless communication device after the indication unit indicates the result of the diagnosis.

In such a case, it is possible to suppress an abnormal radio wave, which interferes with wireless communication of another wireless communication device, from being transmitted from the wireless communication device of the present invention The indication unit may be configured to continue to indicate the result of the diagnosis even after the communication device power interruption unit is activated.

The wireless communication device of the present invention may include a transmission system circuit power interruption unit that interrupts at least a power supply of the transmission unit after the indication unit indicates the result of the diagnosis.

In such a case, it is possible not only to suppress an abnormal radio wave, which interferes with wireless communication of another wireless communication device, from being transmitted from the wireless communication device of the present invention, but also to receive a transmission signal from another wireless communication device to obtain information from the another wireless communication device if the reception system circuit in the wireless communication device of the present invention is in a normal state.

The indication unit may be configured to continue to indicate the result of the diagnosis even after the transmission system circuit power interruption unit is activated.

The wireless communication device of the present invention may be installed in a mobile body or installed in a fixed station that performs wireless communication with a wireless communication device installed in a mobile body.

BRIEF DESCRIPTION OF THE DRAWINGS

The present invention will be described below by way of example with reference to the accompanying drawings, in which:

FIG. 1 is a block diagram showing a configuration of a wireless communication device of an embodiment;

FIG. 4 is a block diagram showing a configuration of a wireless communication device of a modified example.

DETAILED DESCRIPTION OF THE PREFERRED EMBODIMENTS

Figure 2A:
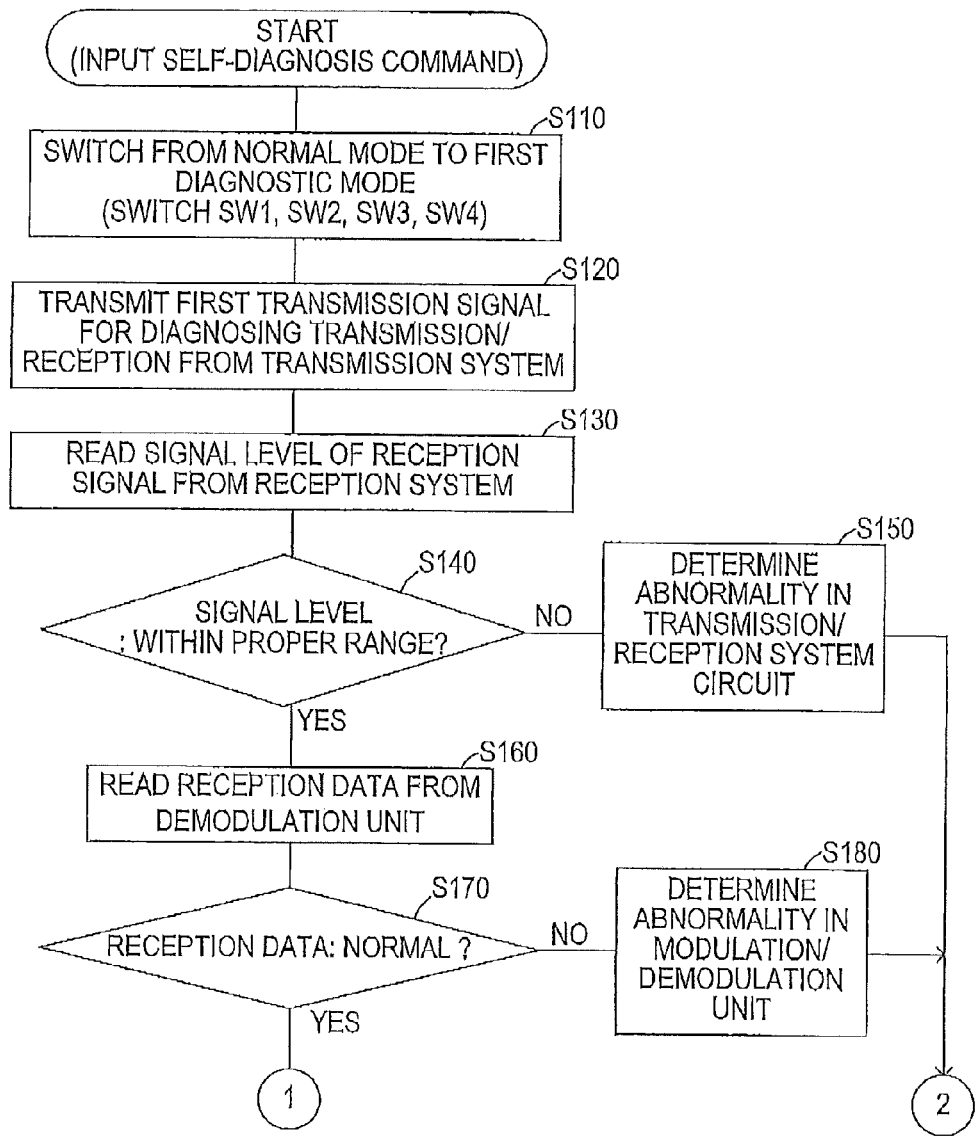
FIGS. 2A and 2B are flowcharts showing a fault diagnosis process performed by a control unit of the embodiment.

A wireless communication device 1 of the present embodiment shown in FIG. 1 is, for example, installed in a mobile body 100 such as an automobile, and performs wireless communication with a wireless communication device installed in another mobile body (a vehicle-to-vehicle communication) or with a wireless communication device installed in a fixed station 200, which performs wireless communication with wireless communication devices installed in these mobile bodies, such as a roadside machine positioned in a vicinity of a travel path (a road-to-vehicle communication), using a CSMA/CA (Carrier Sense Multiple Access/Collision Avoidance) system. The wireless communication device 1 includes an antenna 2 for communication.

Since transmission/reception, is performed using one communication channel in the CSMA/CA system, either of an analog circuit of a reception system and an analog circuit of a transmission system is selectively connected to the antenna 2 through a radio-frequency switch (hereinafter referred to as an "RFSW") 9 for switchover between transmission and reception.

The analog circuit of the reception system includes a low noise amplifier (hereinafter referred to as an "LNA") 4 that amplifies a reception signal from the antenna 2; and a frequency conversion unit 5 that frequency-converts (down-converts) the reception signal amplified in the LNA 4 into a base-band reception signal.

The base-band reception signal frequency-converted in the frequency conversion unit 5 is inputted into a base band processor 10.

The base band processor 10 includes an A-D conversion unit 12 that converts the reception signal into a digital signal; and a demodulation unit 14 that processes the digital signal A-D converted by the A-D conversion unit 12 to restore the reception data.

The reception data restored in the demodulation unit 14 is outputted to a MAC (Media Access Control) unit 20 that performs a predetermined operation relating to a MAC layer. After processed in the MAC unit 20, the reception data is outputted to an ECU (an electronic control unit: for example, a navigation device for driver assistance and the like) installed in the mobile body 100.

A transmission data is inputted from the ECU into the MAC unit 20, and the MAC unit 20 processes the inputted data to output the processed inputted data to the base band processor 10 at such a transmission timing as to be set based on a carrier sense.

In the base band processor 10, there are provided a modulation unit 16 that modulates the inputted data from the MAC unit 20 into a transmission signal (a digital signal) in accordance with a preset modulation system; and a D-A conversion unit 18 that converts the digital signal from the modulation unit 16 into an analog signal.

The transmission signal converted into the analog signal by the D-A conversion unit 18 is outputted to the RFSW 9 through the analog circuit of the transmission system.

The analog circuit of the transmission system includes a frequency conversion unit 7 that frequency-converts (up-converts) a base-band transmission signal outputted from the D-A conversion unit 18 in the base band processor 10 into a high-frequency signal for wireless transmission; and a power amplifier (hereinafter referred to as a "PA") 8 that amplifies the transmission signal frequency-converted by the frequency conversion unit 7.

In the frequency conversion unit 5 of the reception system and the frequency conversion unit 7 of the transmission system, there are respectively provided a level detection unit 5a and a level detection unit 7a that respectively detect a signal level of the reception signal and a signal level of the transmission signal, which are used for gain control and the like of the LNA 4 and the PA 8, respectively.

In both of a reception signal path connecting the LNA 4 of the reception system and the RFSW 9, and a transmission signal path connecting the PA 8 of the transmission system and the RFSW 9, there is provided a path switchover circuit 22.

The path switchover circuit 22 is configured to selectively close each of the reception signal path between the LNA 4 and the RFSW 9, and the transmission signal path between the PA 8 and the RFSW 9 when the wireless communication device 1 is in a normal communication mode, and is configured to form a signal path for fault diagnosis when the wireless communication device 1 is in a fault diagnostic mode for diagnosing a fault, to thereby make it possible to perform a fault diagnosis of the wireless communication device 1. More specifically, the path switchover circuit 22 includes four high-frequency switches (hereinafter referred to as "switchover switches") SW1 to SW4 for switching the signal paths; an attenuator ATT; a termination resistor RT having a resistance corresponding to transmission impedance of the signal paths; and a directional coupler 24.

The switchover switch SW1 is provided in the transmission signal path between the PA 8 of the transmission system and the RFSW 9 to close/interrupt the transmission signal path. The switchover switch SW2 is provided in the reception signal path between the RFSW 9 and the LNA 4 of the reception system to close/interrupt the reception signal path.

When the transmission signal path and the reception signal path are in an interrupted state, the switchover switches SW1 and SW2 form a loopback path that connects an output of the PA 8 to an input of the LNA 4.

In the loopback path, the attenuator ATT and the switchover switch SW3 are provided. The attenuator ATT is provided on a switchover switch SW2 side in the loopback path. The switchover switch SW3 is provided such that a side opposite to a switchover switch SW2 side of the attenuator ATT is switchably connected to a switchover switch SW1 side or to a switchover switch SW4 side.

The directional coupler 24 is disposed on an RFSW 9 side rather than on a switchover switch SW1 side in the transmission signal path leading from the PA 8 of the transmission system down to the RFSW 9. The directional coupler 24 extracts a high-frequency signal (in other words, a reflection signal generated when the transmission signal is reflected at the antenna 2) flowing through the transmission signal path in an opposite direction (a direction heading from the RFSW 9 to the PA 8).

The switchover switch SW4 is provided so as to be able to switch between a state in which an output end of the reflection signal in the directional coupler 24 is terminated through the termination resistor RT and a state in which the output end is connected to the switchover switch SW3 (thus to the attenuator ATT).

The base band processor 10 includes the A-D conversion unit 12, the demodulation unit 14, the modulation unit 16, and the D-A conversion unit 18, which are used to digitally process the reception signal or the transmission signal. The base band processor 10 further includes a control unit 30 that performs various controls for wireless communication in synchronization with an access control by the MAC unit 20 during wireless communication. Such various controls for wireless communication include a switchover between transmission and reception by the RFSW 9, a gain control (GC) of the LNA 4 of the reception system and the PA 8 of the transmission system, controls of the frequency conversion unit 5 of the reception system and the frequency conversion unit 7 of the transmission system, and the like.

Figure 2B:
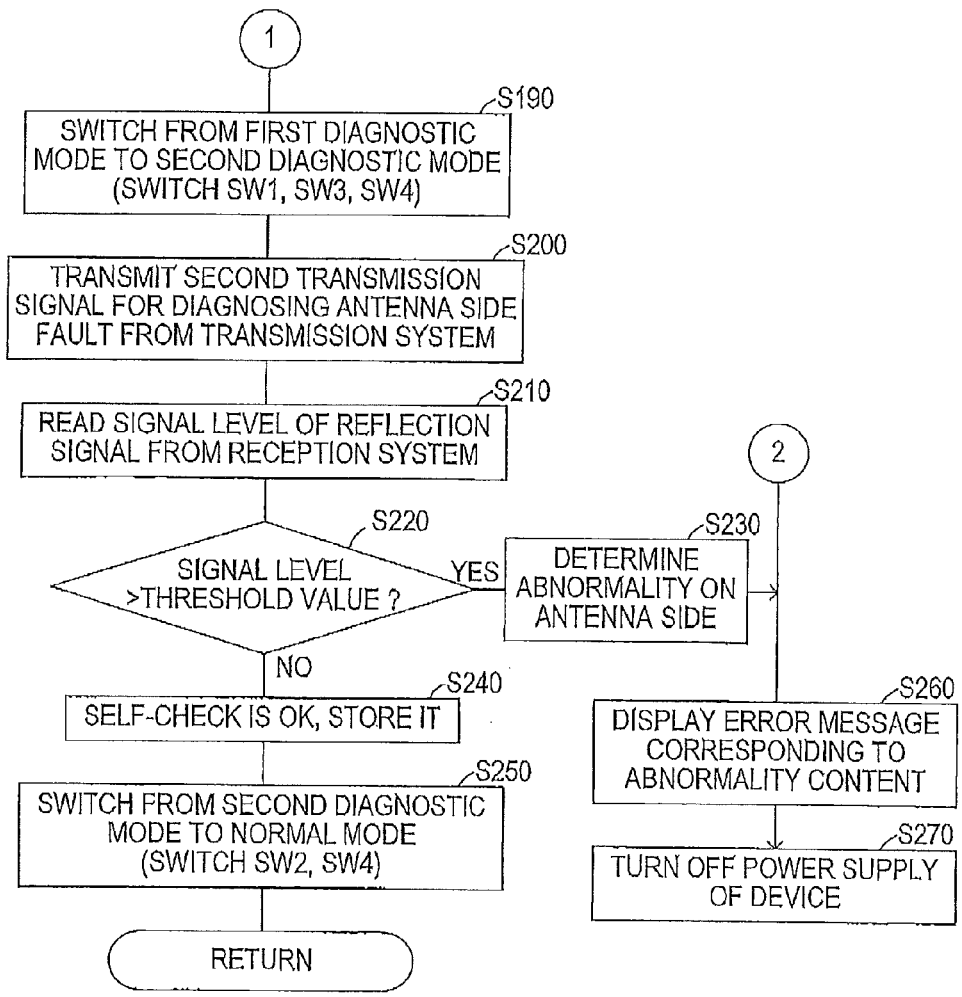

In the present embodiment, when a self-diagnosis command is inputted at a time of shipment, inspection, or the like of the wireless communication device 1, the control unit 30 performs a fault diagnosis of a transmission system circuit, a reception system circuit, and the antenna 2 in accordance with steps shown in FIGS. 2A and 2B.

An explanation will be given below about a fault diagnosis process thus performed in the control unit 30 with reference to FIGS. 2A and 2B. In performing the fault diagnosis process, a display unit 32 for indicating diagnosis results is connected to the control unit 30.

As shown in FIGS. 2A and 2B, when the fault diagnosis process is started, an operation mode of the wireless communication device 1 is firstly switched in S110 (S represents a step) from a normal mode in which a wireless communication is performed to a first diagnostic mode in which a fault diagnosis of the reception system circuit (specifically, the LNA 4, the frequency conversion unit 5, the demodulation unit 14, and the like) and the transmission system circuit (specifically, the frequency conversion unit 7, the PA 8, the modulation unit 16, and the like) is performed by switching the paths of the transmission signal and the reception signal through the path switchover circuit 22.

Specifically, in the present embodiment, in the normal mode in which a wireless communication is performed, the switchover switches SW1 and SW2 are set to sides to respectively close the transmission signal path and the reception signal path, the switchover switch SW3 is set to a switchover switch SW4 side, and the switchover switch SW4 is set to a termination resistor ET side as shown in FIG. 1.

Figure 3A:
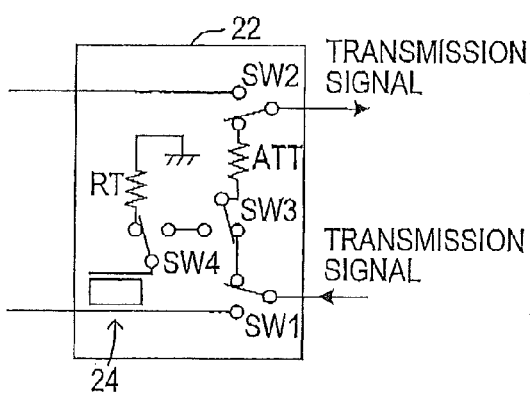
FIGS. 3A and 3B are explanatory diagrams showing states of a path switchover circuit that is switched as the fault diagnosis process shown in FIGS. 2A and 2B is performed.

In S110, the switchover switches SW1 and SW2 are switched to sides to respectively interrupt the transmission signal path and the reception signal path (in other words, to the loopback path sides), and the switchover switch SW3 is switched to a switchover switch SW1 side as shown in FIG. 3A.

As a result, in the first diagnostic mode, the output of the PA 8 is to be connected to the input of the LNA 4 through the loopback path including the attenuator ATT.

Next, in S120, a transmission data for fault diagnosis of the transmission system circuit and the reception system circuit is outputted to the modulation unit 16 through the MAC unit 20, and each circuit section of the transmission system is thereby operated to transmit a first transmission signal of a preset signal level from the PA 8 to the LNA 4 for a given period of time.

At a time of such a transmission, a gain of the PA 8 is adjusted (gain-controlled) based on the signal level of the transmission signal detected in the level detection unit 7a in the frequency conversion unit 7 of the transmission system so that the first transmission signal is inputted into the LNA 4 of the reception system at a proper level.

Then, in S130, the signal level of the reception signal of the first transmission signal is read from the level detection unit 5a provided in the frequency conversion unit 5 of the reception system within a transmission period of the first transmission signal, and it is determined in S140 whether or not the signal level is within a proper range.

If it is determined in S140 that the signal level read from the level detection unit 5a is not within the proper range, it is determined in S150 that the transmission system circuit or the reception system circuit (here, the analog circuits such as the LNA 4, the frequency conversion units 5 and 7, and the PA 8) has an abnormality, and the process proceeds to S260, which will be described later. In contrast, if it is determined in S140 that the signal level is within the proper range, the process proceeds to S160.

Next, in S160, a reception data obtained by demodulating the reception signal is read from the demodulation unit 14. Then, in S170, it is determined whether or not the read reception data is normal (specifically, whether or not the read reception data is identical to the transmission data for fault diagnosis, which was made transmitted through the MAC unit 20 in S120).

If it is determined in S170 that the reception data is not normal, it is determined in S180 that the modulation unit 16 or the demodulation unit 14, which are respectively the transmission system circuit and the reception system circuit in the base band processor 10, has an abnormality, and the process proceeds to S260, which will be described later. In contrast, if it is determined in S170 that the reception data is normal, the process proceeds to S190.

In S190, the operation mode of the wireless communication device 1 is switched from the first diagnostic mode to a second diagnostic mode, in which a fault diagnosis is performed on a side nearer to the antenna (i.e., the antenna 2, the RFSW 9, and the like) rather than the LNA 4 and the PA 8.

Figure 3B:
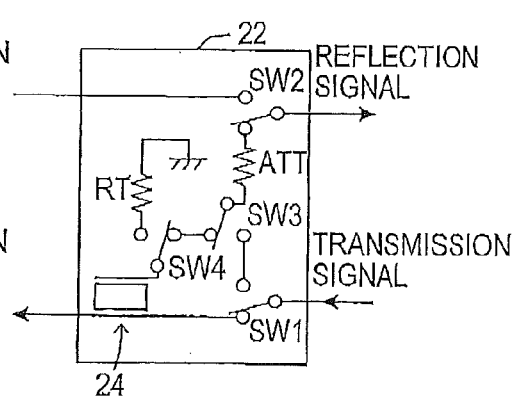

As is obvious from FIGS. 3A and 3B, in the second diagnostic mode, the switchover switch SW1 is switched to a side to close the transmission signal path, the switchover switch SW3 is switched to a switchover switch SW4 side, and the switchover switch SW4 is switched to a switchover switch SW3 side.

As a result, in the second diagnostic mode, an output of the PA 8 is connected to the RFSW 9 (thus to the antenna 2), and a reflection signal input path is to be formed that inputs a reflection signal from an antenna 2 side, which is extracted in the directional coupler 24, into the LNA 4 through the attenuator ATT.

Next, in S200, a transmission data for fault diagnosis of the antenna side is outputted to the modulation unit 16 through the MAC unit 20, and each circuit section of the transmission system is thereby operated to transmit a second transmission signal of a preset signal level from the PA 8 for a given period of time.

In S200, in order to transmit the second transmission signal to the antenna 2 and to cause the second transmission signal to be transmitted from the antenna 2, the RPSW 9 is switched to a transmission side. Since the transmission data in the second diagnostic mode is to reach another wireless communication device, data contents of the transmission data and the signal level of the transmission signal outputted from the PA 8 are so set as not to affect a communication with the another wireless communication device.

Next, in S210, a signal level of the reflection signal from the antenna 2 side is read from the level detection unit 5a provided in the frequency conversion unit 5 of the reception system within a transmission period of the second transmission signal, and in S220, it is determined whether or not the signal level is greater than a preset threshold value (upper limit value) (i.e., whether or not an amount of reflection from the antenna 2 is large).

If it is determined in S220 that the signal level read from the level detection unit 5a is greater than the threshold value, it is determined in S220 that the antenna side (i.e., the antenna 2, the RFSW 9, and the like) has an abnormality, and the process proceeds to S260, which will be described later. In contrast, if it is determined in S220 that the signal level is equal to or less than the threshold value, the process proceeds to S240.

In S240, as a result of the above described fault diagnosis, it is determined that the transmission system circuit, the reception system circuit, and the antenna 2 of the wireless communication device 1 have no abnormality (the self-check is OK), and information to that effect is stored in a memory.

Then, in subsequent S250, the operation mode of the wireless communication device 1 is switched from the second diagnostic mode to the normal mode, and the fault diagnosis process ends.

In S250, the path switchover circuit 22 is set to a state shown in FIG. 1 by switching the switchover switch SW2 to a side to close the reception signal path and by switching the switchover switch SW4 to a termination resistor RT side.

In a case where an abnormality is determined to exist in S150, S180, or S230, the process proceeds to S260 and the abnormality (fault) in the wireless communication device 1 is indicated to a driver and the like by displaying on the display unit 32 an error message corresponding to a content of the determined abnormality. Then, the process proceeds to S270 to interrupt a power supply of the wireless communication device 1.

The display unit 32 is disposed in a position that can be visually confirmed by the driver of the mobile body 100, for example, on an instrument panel of the automobile. Once a command to display the error message is received from the control unit 30, the error message is displayed on the display unit 32 continuously even after the power supply of the wireless communication device 1 is interrupted.

As described above, according to the wireless communication device 1 of the present embodiment, when the self-diagnosis command is inputted into the control unit 30, the operation mode of the wireless communication device 1 is sequentially switched from the normal mode to the first diagnostic mode, and from the first diagnostic mode to the second diagnostic mode.

In the first diagnostic mode, the path switchover circuit 22 is so switched by the control unit 30 as to directly input the transmission signal from the PA 8 of the transmission system into the LNA 4 of the reception system through the loopback path. Then, it is determined whether or not the analog circuits of the transmission system and the reception system, and the modulation unit 16 and the demodulation unit 14 in the base band processor 10 are operating normally based on the signal level of the reception signal detected in the level detection unit 5a and the demodulated data demodulated in the demodulation unit 14.

When it is determined that the transmission system and the reception system are operating normally in the first diagnostic mode, the operation mode proceeds to the second diagnostic mode, and the transmission signal is transmitted from the PA 8 of the transmission system to the antenna 2 by the control unit 30. Then, the path switchover circuit 22 is so switched as to form the reflection signal input path, which inputs the reflection signal of the transmission signal from the antenna 2 into the LNA 4 of the reception system.

In the second diagnostic mode, when the signal level of the reflection signal detected in the level detection unit 5a provided in the frequency conversion unit 5 of the reception system is greater than the predetermined threshold value (in other words, when the amount of the reflection from the antenna 2 side is large), the control unit 30 determines that there exists an abnormality in the antenna 2 or the RFSW 9.

Consequently, according to the wireless communication device 1 of the present embodiment, it is possible not only to self-diagnose whether or not the analog circuits of the transmission system and the reception system, the modulation unit 16, and the demodulation unit 14 are operating normally in the first diagnostic mode, but also to self-diagnose whether or not a transmission path of the transmission signal leading from the PA 8 of the transmission system down to the antenna 2 and the antenna 2 are operating normally in the second diagnostic mode.

The self-diagnosis in the second diagnostic mode is performed by extracting in the directional coupler 24 the reflection signal reflected from the antenna 2 side, and then detecting the signal level of the extracted reflection signal through the level detection unit 5a provided in the frequency conversion unit 5 of the reception system. Therefore, it is unnecessary to use a reception signal from another wireless communication device when diagnosing a fault on the antenna 2 side.

Consequently, according to the wireless communication device 1 of the present embodiment, the fault diagnosis on the antenna 2 side can be performed even when there exists no other wireless communication device around the wireless communication device 1. As a result, reliability of the wireless communication device 1 can be enhanced.

Moreover, in the path switchover circuit 22, since the attenuator ATT is provided in the loopback path that inputs the transmission signal and the reflection signal into the LNA 4, it can be suppressed that the high-level signal is inputted into the LNA 4 after a high-level transmission signal is outputted from the PA 8 due to a fault in the PA 8 or the like. The attenuator ATT may be constituted by a variable attenuator to vary a signal input level of a signal to be inputted into the LNA 4 by adjusting an attenuation amount.

Furthermore, according to the wireless communication device 1 of the present embodiment, since, when an abnormality is detected in the first diagnostic mode or the second diagnostic mode, a content of the detected abnormality is displayed on the display unit 32 and the power supply is interrupted, it is possible not only to indicate to the driver the abnormality in the wireless communication device 1 to encourage the driver to perform a repair, but also to suppress an abnormal radio wave, which interferes with wireless communication of another wireless communication device, from being transmitted from the wireless communication device 1.

Still furthermore, in the normal mode, since the switchover switch SW4 in the path switchover circuit 22 is switched to the termination resistor RT side, and thus the output end of the reflection signal of the directional coupler 24 is terminated at the termination resistor RT, it is possible, during wireless communication, to suppress the reflection signal of the transmission signal reflected from the antenna 2 side from being emitted from the output end of the reflection signal of the directional coupler 24 to affect the wireless communication.

Here, in the present embodiment, the frequency conversion unit 7, the PA 8, and the modulation unit 16 of the transmission system correspond to an example of a transmission unit of the present invention; the LNA 4, the frequency conversion unit 5, and demodulation unit 14 of the reception system correspond to an example of a reception unit of the present invention; the RFSW 9 corresponds to an example of a transmission/reception switchover unit of the present invention; the switchover switches SW1, SW2 and SW3 in the path switchover circuit 22 correspond to an example of a first path switchover unit of the present invention; and the switchover switches SW4, SW3, and SW2 in the path switchover circuit 22 correspond to an example of a second path switchover unit of the present invention.

Furthermore, the control unit 30 performing the processings of S110 to S180 in the fault diagnosis process corresponds to an example of a first fault diagnosis unit of the present invention; the control unit 30 performing the processings of S190 to S230 corresponds to an example of a second fault diagnosis unit of the present invention; and the control unit 30 performing the processing of S260 and the display unit 32 correspond to an example of an indication unit of the present invention.

Although one embodiment of the present invention has been described hereinabove, the present invention is not limited to the embodiment and various embodiments are possible within a scope not departing from the spirit of the present invention.

For example, although it has been described in the above embodiment that the fault diagnosis process is performed by the control unit 30 for communication control provided in the base band processor 10, the fault diagnosis process may be performed, for example, by a self-cheek unit (microcomputer) 40 provided separately from the control unit 30 in the base band processor 10 as shown in FIG. 4.

Moreover, although it has been described in the above embodiment that the wireless communication device 1 is installed in the mobile body 100 such as an automobile, the wireless communication device 1 may be installed in the fixed station 200, for example. In such a case, similar effects to those in the above embodiment can be obtained.

Furthermore, although it has been described in the above embodiment that, in the fault diagnosis process shown in FIGS. 2A and 2B, when an abnormality is determined to exist in S150, S180 or S230 and an error message corresponding to a content of the abnormality is displayed in S260, the process proceeds to S270 to interrupt the power supply of the wireless communication device 1, a configuration may be possible in S270 in which a power supply of the transmission system circuit (at least the PA 8) is interrupted and power supply to the reception system circuit is continued.

Such a configuration makes it possible not only to suppress an abnormal radio wave, which interferes with wireless communication, of another wireless communication device, from being transmitted from the wireless communication device 1, but also to receive a transmission signal from another wireless communication device and obtain information from the another wireless communication device if the reception system circuit is in a normal state.

Although it has been described in the above embodiment that the operation mode of the wireless communication device 1 is switched to the first diagnosis mode and then further to the second diagnosis mode, the operation mode may be switched to the second diagnosis mode before switched to the first diagnosis mode.

What is claimed is:

1. A wireless communication device that performs transmission and reception in a time-division manner comprising:
   an antenna for communication;
   a transmission unit that amplifies a transmission signal and outputs the amplified transmission signal to the antenna;
   a reception unit that amplifies a reception signal from the antenna and signal-processes the amplified reception signal;
   a transmission/reception switchover unit that selectively connects the antenna to either of the transmission unit and the reception unit;
   a first path switchover unit that closes a transmission signal path between the transmission unit and the transmission/reception switchover unit, and a reception signal path between the transmission/reception switchover unit and the reception unit, to thereby form a loopback path which inputs the transmission signal from the transmission unit into the reception unit;
   a directional coupler that is provided in the transmission signal path and extracts a reflection signal from the antenna flowing through the transmission signal path;

a second path switchover unit that forms a reflection signal input path which inputs the reflection signal extracted by the directional coupler into the reception unit;

a first fault diagnosis unit that forms the loopback path through the first path switchover unit; causes a first transmission signal level-adjusted for fault diagnosis to be outputted from the transmission unit; acquires from the reception unit at least either of a signal level of the reception signal and a result of the signal-processing of the reception signal; and determines whether or not the first transmission signal from the transmission unit has been normally received by the reception unit based on the at least either of the signal level of the reception signal and the result of the signal-processing of the reception signal; and a second fault diagnosis unit that causes the second path switchover unit to form the reflection signal input path; causes a second transmission signal level-adjusted for fault diagnosis to be outputted from the transmission unit; acquires a signal level of the reflection signal from the antenna inputted from the directional coupler into the reception unit; and determines whether or not a transmission radio wave has been normally emitted from the antenna based on the signal level of the reflection signal.

2. The wireless communication device according to claim 1, wherein the first fault diagnosis unit is activated when an operation mode of the wireless communication device is switched from a normal mode in which wireless transmission and wireless reception are performed in a time-division manner to a fault diagnosis mode, and wherein the second fault diagnosis unit is activated when it is determined by the first fault diagnosis unit that the first transmission signal from the transmission unit has been normally received by the reception unit, and terminates formation of the loopback path by the first path switchover unit before causing the second path switchover unit to form the reflection signal input path.

3. The wireless communication device according to claim 1, wherein the loopback path includes an attenuator that adjusts an input level of the transmission signal to the reception unit.

4. The wireless communication device according to claim 1, wherein the second path switchover unit includes a termination resistor that terminates an output end of the reflection signal of the directional coupler with proper impedance when the reflection signal input path is not formed.

5. The wireless communication device according to claim 1, further comprising an indication unit that indicates a result of a diagnosis by the first fault diagnosis unit and the second fault diagnosis unit.

6. The wireless communication device according to claim 5, further comprising a communication device power interruption unit that interrupts a power supply of the wireless communication device after the indication unit indicates the result of the diagnosis.

7. The wireless communication device according to claim 6, wherein the indication unit is configured to continue to indicate the result of the diagnosis even after the communication device power interruption unit is activated.

8. The wireless communication device according to claim 5, further comprising a transmission system circuit power interruption unit that interrupts at least a power supply of the transmission unit after the indication unit indicates the result of the diagnosis.

9. The wireless communication device according to claim 8, wherein the indication unit is configured to continue to indicate the result of the diagnosis even after the transmission system circuit power interruption unit is activated.

10. The wireless communication device according to claim 1, wherein the wireless communication device is installed in a mobile body.

11. The wireless communication device according to claim 1, wherein the wireless communication device is installed in a fixed station that performs wireless communication with a wireless communication device installed in a mobile body.

* * * * *